United States Patent
Kudchadkar et al.

(10) Patent No.: US 12,015,442 B2
(45) Date of Patent: Jun. 18, 2024

(54) VISIBLE LIGHT COMMUNICATION FOR VERIFYING A SECURE WIRELESS CONNECTION

(71) Applicant: FISERV, INC., Brookfield, WI (US)

(72) Inventors: Kamlesh Kudchadkar, Mountain View, CA (US); Brian Jeremiah Murray, Mountain View, CA (US); Bambi Tsui, San Francisco, CA (US)

(73) Assignee: FISERV, INC., Brookfield, WI (US)

( * ) Notice: Subject to any disclaimer, the term of this patent is extended or adjusted under 35 U.S.C. 154(b) by 17 days.

(21) Appl. No.: 17/952,853

(22) Filed: Sep. 26, 2022

(65) Prior Publication Data
US 2023/0016011 A1    Jan. 19, 2023

Related U.S. Application Data (63) Continuation of application No. 16/820,364, filed on Mar. 16, 2020, now Pat. No. 11,489,592.

(51) Int. Cl.
*H04B 10/116* (2013.01)
*H04L 9/08* (2006.01)
(Continued)

(52) U.S. Cl.
CPC ........... *H04B 10/116* (2013.01); *H04L 9/085* (2013.01); *H04W 12/037* (2021.01); *H04W 12/50* (2021.01); *H04W 76/10* (2018.02)

(58) Field of Classification Search
CPC .. H04B 10/116; H04W 76/10; H04W 12/037; H04W 12/50; H04L 9/085
(Continued)

(56) References Cited

U.S. PATENT DOCUMENTS 8,260,261 B2    9/2012  Teague
9,647,755 B1    5/2017  Johnson
(Continued)

FOREIGN PATENT DOCUMENTS

EP          1 398 987 A1    3/2004
WO    WO-2020/035625 A1    2/2020

OTHER PUBLICATIONS

International Search Report and Written Opinion dated May 5, 2021 from International Application No. PCT/US2021/018226, 18 pages.
(Continued)

*Primary Examiner* — Dalzid E Singh
(74) *Attorney, Agent, or Firm* — FOLEY & LARDNER LLP (57) ABSTRACT

Systems and methods for forming a verified secure wireless connection are disclosed. One system includes a first device with a first transceiver and a second device with a second transceiver. The second device does not include a display or any other means for providing high resolution visible light information. The system also includes a visible light signal source on the second device. The first and second devices store computer-readable instructions to initialize a secure wireless connection using the first transceiver and the second transceiver. The second device also stores computer-readable instructions to generate a visible light signal using the visible light source. The first device stores computer-readable instructions to verify the secure wireless connection using the visible light signal.

16 Claims, 8 Drawing Sheets

(51) Int. Cl.
  *H04W 12/037* (2021.01)
  *H04W 12/50* (2021.01)
  *H04W 76/10* (2018.01)

(58) Field of Classification Search
  USPC ............................................. 398/118
  See application file for complete search history.

(56) References Cited

U.S. PATENT DOCUMENTS

| | | | |
|---|---|---|---|
| 9,900,091 B2 | 2/2018 | Choi et al. | |
| 2008/0113618 A1* | 5/2008 | De Leon ........... | H04M 1/72412 340/815.45 |
| 2009/0158039 A1 | 6/2009 | Prasad et al. | |
| 2009/0176451 A1 | 7/2009 | Yang et al. | |
| 2012/0057705 A1* | 3/2012 | Shah ................. | H04L 9/3215 380/270 |
| 2015/0098706 A1* | 4/2015 | Narendra ........... | H04B 10/1143 398/115 |
| 2015/0138008 A1* | 5/2015 | Brown ............... | G08C 19/28 341/173 |
| 2015/0188633 A1 | 7/2015 | Liu et al. | |
| 2016/0050700 A1* | 2/2016 | Gu ..................... | H04W 4/80 398/118 |
| 2017/0004475 A1* | 1/2017 | White ................ | G07G 1/0036 |
| 2021/0266733 A1* | 8/2021 | Bushmeyer ........ | H04B 10/85 |

OTHER PUBLICATIONS

Niu et al., "VINCE: exploiting visible light sensing for smartphone-based NFC systems", IEEE Conference on Computer Communications, 2015, 9 pages.

Saxena et al., "Secure device pairing based on a visual channel: design and usability study", IEEE Transactions on Information Forensics and Security, Mar. 2011, vol. 6, No. 1, 11 pages.

Boubezari et al., "Novel Detection Technique for Smartphone to Smartphone Visible Light Communications", IEEE Technical Disclosure, 2016 10th International Symposium on Communication Systems, Networks and Digital Signal Processing, published 2016, viewed online at https://ieeexplore.ieee.org/documenl/7573915, 5 pages.

Extended European Search Report issued in connection with EP Appl. No. 21772356.8 dated Mar. 18, 2024.

* cited by examiner

VISIBLE LIGHT COMMUNICATION FOR VERIFYING A SECURE WIRELESS CONNECTION

CROSS-REFERENCE TO RELATED PATENT APPLICATIONS

This application is a continuation of U.S. application Ser. No. 16/820,364, filed on Mar. 16, 2020, the entirety of which is incorporated by reference herein.

BACKGROUND

Figure 1:
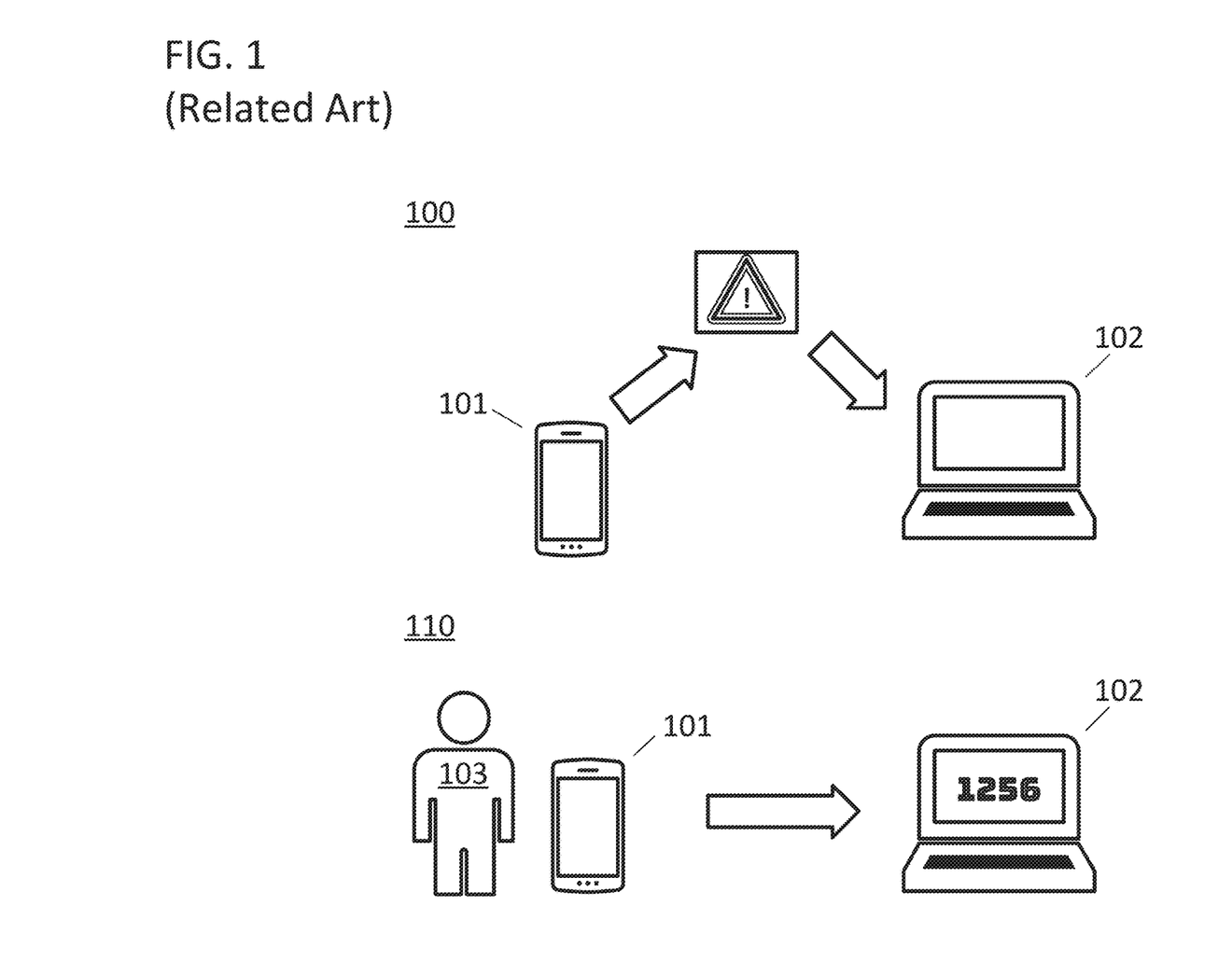
FIG. 1 includes a block diagram of a pair of devices suffering a man in the middle (MITM) attack during the initialization of a secure connection and a block diagram of the same devices practicing a verification procedure for the secure connection to prevent MITM attacks in accordance with the related art.

Wireless communication technologies such as Bluetooth and WiFi Direct are commonly used to pair two devices in order for the devices to communicate with each other and transfer information from one device to the other. Given the popularity of using a wireless connection to transmit sensitive information between devices, it is important to ensure that the wireless connection is secure from third-party attacks. One such form of attack could be a man-in-the-middle (MITM) attack, in which a third-party intercepts and relays the communication between two devices by impersonating one or both of the devices and fooling the two devices into believing they are communicating directly with each other instead of through an attacker. FIG. 1 includes a block diagram 100 of a pair of devices suffering a man in the middle (MITM) attack. As shown in block diagram 100, the connection between a mobile device 101 and a computing device 102 is compromised by an intermediary attacker that intercepts the communication from the mobile device and relays it to the computing device without the computing device realizing that the connection is unsecure.

In the example of Bluetooth, various pairing methods can be used to protect against MITM attacks including but not limited to using a passkey, numeric comparison, and out of band (OOB) key delivery. For example, using a passkey or numeric comparison can provide an additional level of security against MITM attacks by requiring the user to verify the secure connection. Numeric comparison involves comparing a number or other string presented on both devices during the pairing procedure so that a human operator can be sure that the two devices are the devices that are being paired. Passkey involves a human operator entering a number or other string that is associated with one device into the alternative device to provide the same assurance. The number can be associated with the device by being written in a manual for the device or by being stored on, or derived on, the device and displayed to the user. In the example of OOB key delivery, an alternate, secure communication channel is used to create a secure connection between two paired devices by delivering a pairing key to both of those devices via the secure communication channel. In the example of FIG. 1, block diagram 110 shows the same devices from block diagram 100 establishing a secure connection through a system in which a passkey is displayed on computing device 102 to be inputted by a user 103 on mobile device 101 in order to verify the secure connection is being formed between the two devices and avoid an MITM attack in accordance with the related art. As an intermediary snooping the initial handshake on the wireless connection between the two devices would not have access to the number displayed on computing device 102, mobile device 101 can be assured it is pairing with the correct device.

SUMMARY

This disclosure relates to the use of visible light communications (VLC) for purposes of verifying a secure wireless connection between two devices. The wireless connection can be a radio frequency connection, an infrared connection, an ultraviolet light connection, and any other form of wireless connection that is not a visible light connection. Regardless of the type of wireless connection which is being verified, specific embodiments of the invention disclosed herein can prevent man-in-the-middle (MITM) attacks on a wireless connection that cannot be observed using the human eye by adding a verification layer that is detectible by the human eye (i.e., using a visible light source). Specific embodiments of the invention accordingly exhibit certain benefits as a human observer initializing a secure wireless connection between two devices (e.g., conducting a Bluetooth pairing procedure) can provide visual confirmation that the two devices are being securely connected.

In specific embodiments of the invention, the VLC signal is generated by a basic visible light source. For example, the visible light signal could be generated by a flashing or color changing light emitting diode (LED) where the visible light signal is encoded in the temporal flashing or color changing patterns of the LED. As such, the visible light signal which is used to verify the connection can be generated by a basic device that does not have a display for providing high resolution visible light information. Specific embodiments of the invention accordingly exhibit certain benefits as they can be used to add a verification procedure for a secure connection to a device without increasing the cost of the device. Indeed, in certain embodiments, the basic visible light source could be a light source that was already available on the basic device and is only temporarily re-appropriated for providing verification to the secure wireless connection. For example, the basic visible light source could be an LED used as a status light for an alternative system such as an NFC transceiver or as a power-on indicator.

In specific embodiments of the invention, the VLC signal is generated on a device and is verified by a human user. For example, the human user can view the VLC signal on that device, and enter the signal in on the other device to verify the connection. In specific embodiments, both devices will be capable of generating a VLC signal and the human user can observe the VLC signal from both devices to assure that they match. For example, the VLC signal on both devices could be generated by basic light sources and be presented via a color or flashing pattern on both devices to enable a process similar to the numeric comparison approach used to verify a Bluetooth connection without the need for the devices to have displays for displaying numeric codes. In any of these embodiments, the VLC signal provides a human user with the ability to visually verify a secure connection is protected from MITM attacks when the wireless connection itself is not visible to the human user.

In specific embodiments of the invention, the VLC signal is generated on a device and is verified using a visible light sensor on the other device. For example, the VLC signal could be encoded in a flashing pattern of a basic light source that is too fast for a human user to decode, but that could be viewed by a visible light sensor, such as a camera, on the other device and decoded for automatic verification of the connection. As the human user would be able to visually inspect which device was transmitting light, they would be able to visually verify that the secure connection is protected from MITM attacks even though the wireless connection itself is not visible to the human user.

In specific embodiments of the invention, the light source which is used to display the VLC signal can be a logo with embedded LEDs. The logo could be available on a basic device and be used to display a status of the device (e.g., a power on indicator). However, the LEDs, or other basic light sources, which illuminate the logo could be occasionally repurposed for verifying a secure wireless connection. Specific implementations that are in accordance with these embodiments exhibit certain benefits in that the contours of a logo can be distinguished by standard computer vision processing algorithms to allow for a reliable automated capture of the VLC signal regardless of the presence of background changes in light that could otherwise confuse a computer vision system and attenuate the VLC signal.

In specific embodiments of the invention, and depending upon the specific implementation details thereof, the VLC signal can encode, and be representative of, various types of information. The VLC signal could include a signal for numeric comparison to allow a human observer or automated system to assure that the two devices were in communication with each other via the secure channel by comparing an encoded string held on both devices. In specific embodiments of the invention, such a string could be a shared secret generated during an initial handshake of the wireless connection for which the VLC signal was providing a layer of verification. In specific embodiments of the invention, the VLC signal could encode a temporary key used to finalize a wireless connection such as in the case of a Bluetooth pairing procedure. In specific embodiments of the invention, the VLC signal could serve as the delivery mechanism for an out-of-band (OOB) key delivery for the wireless connection. In many of these embodiments, care should be taken to assure that the VLC signal is not widely visible or otherwise susceptible to over-the-shoulder attacks. If the VLC signal is an OOB key delivery mechanism, the signal should be fully shielded from eavesdroppers.

In specific embodiments of the invention, a system is provided. The system includes a first device having a first processor, a second device having a second processor and a light emitting diode, and one or more computer readable media accessible to the second processor and storing instructions which when executed by the second processor cause the second device to: (i) initialize a secure wireless connection between the first device and the second device; and generate a visible light signal using the light emitting diode. The system also includes one or more computer readable media accessible to the first processor and storing instructions which when executed by the first processor cause the first device to: verify the secure wireless connection on the first device using the visible light signal by: (i) generating the same visible light signal on the first device using a display of the first device; and (ii) accepting a comparison verification input on a user interface of the first device.

In specific embodiments of the invention, a system is provided. The system includes a first device having a first processor and a visible light sensor, a second device having a second processor and a light emitting diode, and one or more computer readable media accessible to the second processor and storing instructions which when executed by the second processor cause the second device to: initialize a secure wireless connection between the first device and the second device; and generate a visible light signal by illuminating a logo on the second device using the light emitting diode. The system also comprises one or more computer readable media accessible to the first processor and storing instructions which when executed by the first processor cause the first device to: verify the secure wireless connection on the first device using the visible light signal by: capturing the visible light signal generated on the second device using the visible light sensor.

In specific embodiments of the invention, a system for establishing a verified secure wireless connection is provided. The system comprises a first device with a first transceiver and a second device with a second transceiver. The second device does not include a display. The system also includes a visible light signal source on the second device. The first and second devices store computer-readable instructions which when executed by the first and second devices cause the first and second devices to jointly initialize a secure wireless connection using the first transceiver and the second transceiver. The term jointly initialize is used herein to refer to steps taken by two devices, such as in the initial handshake used to form the Link layer of a Bluetooth (BT) connection, to begin the formation of a connection, regardless of which device is the first to discover the other device or otherwise initiate a connection. The second device stores computer-readable instructions which when executed by the second device cause the second device to generate a visible light signal using the visible light source. The first device stores computer-readable instructions which when executed by the first device cause the first device to verify the secure wireless connection using the visible light signal.

In specific embodiments of the invention, a system for forming a verified secure wireless connection is disclosed. The system includes a first device, a second device, and a means for initializing a secure wireless connection between a first device and a second device. The means for initializing the secure wireless connection between the first device and the second device can be two wireless transceivers separately located on the two devices and accompanying software stacks for forming the secure wireless connection including those used for Bluetooth, Wi-Fi Direct, IrDA, UWB, ZigBee, or Induction Wireless, and other personal area network (PAN) connections. The system also includes a means for generating a visible light signal on at least one of the first and second devices. The means for generating the visible signal can be an applications processor, a secure microcontroller, or an applications specific integrated circuit controlling a basic light source, such as one or more light emitting diodes, a light source, such as a laser, or a display. The system also includes a means for verifying the secure wireless connection on at least one of the first and second devices using the visible light signal. The means for verifying the secure wireless connection could be an interface on one of the devices that accepts a confirmation input from the user that two visible light signals, displayed on each of the devices, match. The means for verifying the secure wireless connection could be a camera and computer vision processing algorithm for segmenting and decoding the visible light signal automatically. The means for verifying the secure wireless connection could be an interface on one of the devices that accepts a transcription of the visible light signal on one of the devices such as an interface which allowed a user to click on a set of displayed LEDs to identify which LEDs were illuminated or select a color on a color wheel to show which color of light was being displayed, or any combination of interfaces which allowed the user to describe the appearance of a visible light signal on a touch screen or audio input interface.

DETAILED DESCRIPTION

Methods and systems related to the use of visible light communications (VLC) for purposes of validating a wireless communicative connection in accordance with the summary above are disclosed in detail herein. The methods and systems disclosed in this section are nonlimiting embodiments of the invention, are provided for explanatory purposes only, and should not be used to constrict the full scope of the invention. Throughout this disclosure the example of a "first" device initializing a secure wireless connection with a "second" device is utilized as an example. However, the approaches disclosed herein can be applied to connect any number of devices in any form of network topology including mesh, hub-and-spoke, or daisy-chain topologies. In the examples provided, the second device is generally a less feature-rich device which lacks at least one user interface that is present on the first device (e.g., the first device has a touch display while the second device does not include a display). However, the approaches disclosed herein can be applied to devices with any relative degree of functionality between them.

Figure 2:
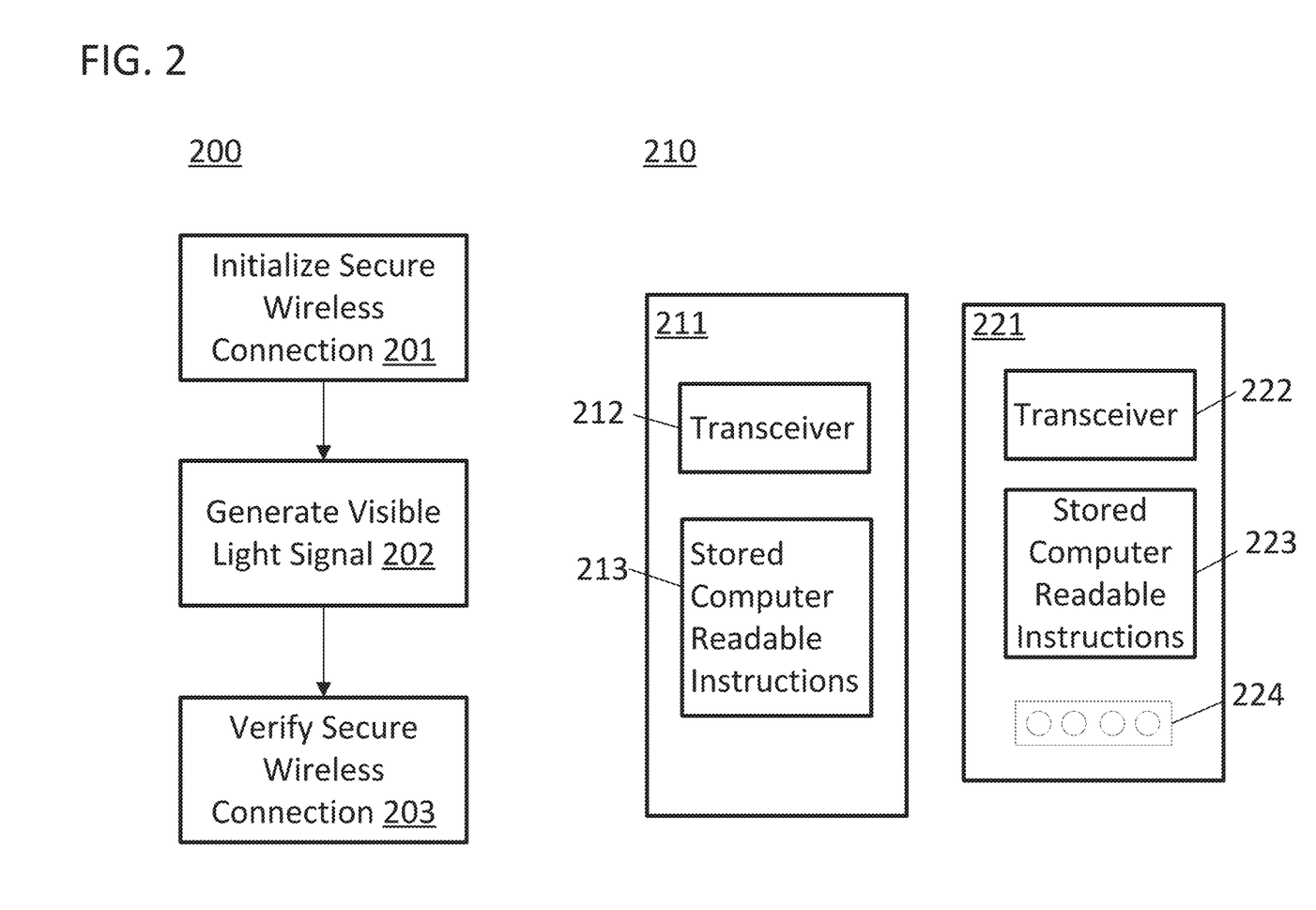
FIG. 2 is a block diagram of a system, and an associated flow chart of a method, for using visible light communication for verifying a secure wireless connection between two devices in accordance with specific embodiments of the invention disclosed herein.

FIG. 2 is a block diagram 210 of a system, and an associated flow chart 200 of a method, for using VLC for verifying a secure wireless connection between two devices in accordance with specific embodiments of the invention disclosed herein. Block diagram 210 includes a first device 211 with a first transceiver 212 and a second device 221 with a second transceiver 222. Both devices can store computer-readable instructions 213, 223 to initialize a secure wireless connection using the first transceiver and the second transceiver. In addition, the second device can store computer-readable instructions to generate a visible light signal using a visible light signal source 224. In specific embodiments of the invention, the second device does not include a display. For example, the first device can be a mobile computing device with a first transceiver, computer-readable instructions, and a display and the second device can be a payment terminal or secure card reader with a second transceiver, computer-readable instructions, and a visible light signal source but without a display.

Flow chart 200 begins with step 201 in which a secure wireless connection is initiated between a first device and a second device. For example, the secure wireless connection can be a radio frequency connection, an infrared connection, an ultraviolet light connection, or any other form of wireless connection that is not a visible light connection. Flow chart 200 continues with step 202 in which a visible light signal is generated on the second device. Flow chart 200 concludes with step 203 in which the secure wireless connection is verified on the first device using the visible light signal. In specific embodiments of the invention, the second device does not include a display.

In specific embodiments of the invention, the visible light signal can be used to verify the secure wireless connection in various ways. For example, a human user can view the visible light signal on a first device and input the visible light signal on a second device to verify the secure wireless connection. As another example, the visible light signal can be displayed by both devices and be visually inspected and compared by a human user to ensure that the two visible light signals match in order to verify the secure wireless connection. As another example, the visible light signal can be generated on a second device and inspected by a visible light sensor such as a camera on a first device that can automatically detect the visible light signal and verify the secure wireless connection.

In specific embodiments of the invention, the visible light signal and source can each take on various forms. The visible light signal can be a blinking pattern or a color pattern. The blinking pattern can be a temporal change in the output of a given light source. For the avoidance of doubt, a light that dims and returns to full brightness is a blinking light. As an example, the visible light signal can be generated by blinking an LED on a device. The color pattern can be a static display of colors by a set of individual lighting elements, a temporal change in the display of color by an individual lighting element, or a combination. For example, the visible light signal can be generated by setting a color of a multicolor LED on a device or, alternatively, by selectively lighting LEDs from a set of LEDs on a device. The visible light signal could also be a combination of a blinking pattern and a color pattern. The source can include a single light source, such as a single LED, or multiple light sources, such as a set of LEDs. Both the single LED and set of LEDs can be multicolor LEDs. The source can be a light source that is already used for another purpose and would be present, or be required to be present on the device, regardless of whether the device could practice the methods disclosed herein. For example, the light source could be a status indicator LED (e.g., a power indicator) that can be reused to communicate a visible light signal. As another example, the light source could be the status indicator of an NFC device that is reused to communicate a visible light signal in accordance with this disclosure. The source can also be an illuminated logo integrated with a device. The source can also be a traditional LCD display. The display can provide a depiction of a more basic light source generating a given visible light signal (e.g., a display can provide a depiction of a colored LED illuminated with a given color). The source can be a display or lighting device from any of the following technologies including but not limited to cathode ray tube, vacuum fluorescent display (VFD), LED, organic LED (OLED), liquid crystal display (LCD), plasma display, electronic paper or e-ink, and electroluminescent display (ELD).

In specific embodiments of the invention, a set of basic light sources can be used to encode a visible light signal in a color pattern that can be used to verify a secure wireless connection and protect against MITM attacks with an additional level of security that is comparable to other pairing methods such as but not limited to numeric comparison using a six digit code. In addition, the set of basic light sources can also be used to encode a visible light signal in more than one color pattern, and the secure wireless connection can be verified through multiple rounds of comparison. For example, the set of basic light sources can be made up of four LEDs that are required by contactless payment standards to be on a payment terminal as status indicator lights. Assuming each LED is an LED with three primary colors and three levels per channel, then the number of possible color patterns that can be generated by the four LEDs to encode a visible light signal would be comparable to the number of possible numeric combinations that can be used to verify a secure wireless connection using numeric comparison with a six digit code. Alternatively, assuming each LED is an LED with three primary colors but only two levels per channel, then a visible light signal can be encoded by using the four LEDs to generate more than one color pattern that can be used to verify the secure wireless connection through two or more rounds of comparison such that the number of possible color patterns multiplied by the number of rounds of comparison would be comparable to the number of possible numeric combinations that can be used to verify a secure wireless connection via numeric comparison with a six digit code.

Figure 3:
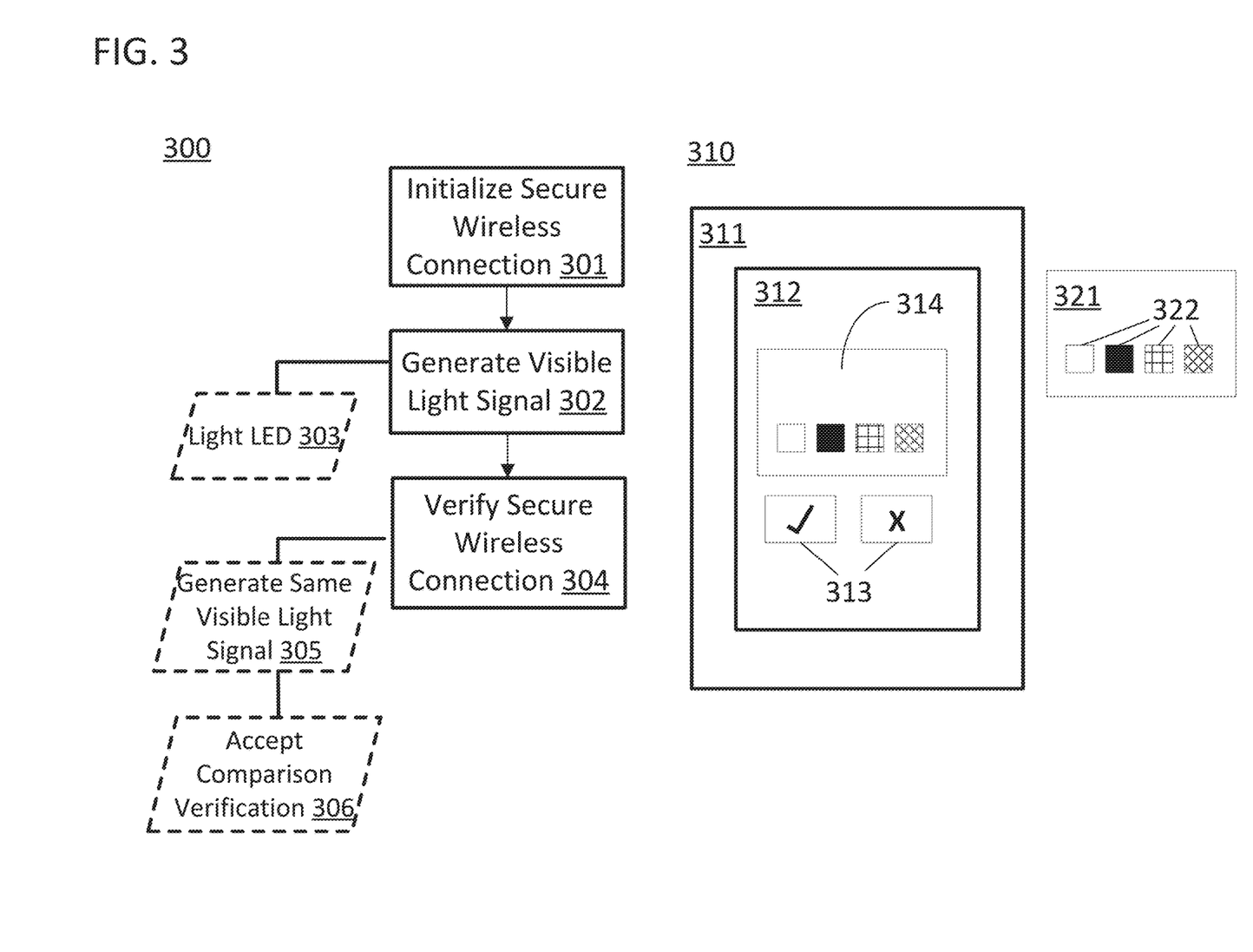
FIG. 3 is a block diagram of a system, and an associated flow chart of a method, for using visible light communication for verifying a secure wireless connection between two devices by allowing a human user to compare the display of the signals in accordance with specific embodiments of the invention disclosed herein.

FIG. 3 is a block diagram 310 of a system, and an associated flow chart 300 of a method, for using visible light communication for verifying a secure wireless connection between two devices by allowing a human user to compare the display of the signals in accordance with specific embodiments of the invention disclosed herein. Flow chart 300 includes sub-steps in tilted parallelograms attached to the steps for which they serve as component sub-steps.

Block diagram 310 includes a first device 311 with an application 312 displayed on a display of first device 311 and a second device 321 with light emitting diodes (LEDs) 322 that can be used for visible light communication. For example, the first device can be a mobile device that can display an application on a display and the second device can be a payment dongle with LEDs that can be used to present a visible light signal. Application 312 can be used to initiate a secure wireless connection between the first device and the second device. For example, the secure wireless connection can be a radio frequency connection, an infrared connection, an ultraviolet light connection, and any other form of wireless connection that is not a visible light connection.

In the example of block diagram 310, once an initial secure wireless connection has been established between the two devices, the second device can present a visible light signal using a pattern of colored LEDs 322, as indicated by the different shadings of each LED on the second device. In addition, application 312 on the first device can display a depiction of the second device, or the LEDs 322 alone, with the same visible light signal. In the illustrated case, application 312 provides a depiction 314 of the device and the LEDs. Application 312 can prompt a human user to compare the depiction of the visible light signal shown on the first device with the actual visible light signal on the second device in order to verify the secure wireless connection, and a human user can verify the secure connection by choosing one of the options 313 also displayed by the applications. In specific embodiments of the invention, the visible light signal presented on the second device and in the depiction of the second device displayed on the first device are determined based on a Diffie-Hellman shared secret between the two devices. In specific embodiments of the invention, the second device does not include a display.

Flow chart 300 begins with step 301 in which a secure wireless connection is initiated between a first device and a second device. Flow chart 300 continues with step 302 in which a visible light signal is generated on the second device. Step 302 includes a component step 303 in which generating a visible light signal on the second device includes lighting an LED on the second device. In specific embodiments of the invention, the one or more LEDs on the second device include at least one colored LED, and the visible light signal is generated using a pattern of colored LEDs on the second device. The pattern can be a color pattern of colors statically displayed by the colored LEDs or a pattern of changing colors displayed by the colored LEDs, or any combination of color patterns and temporal patterns. Flow chart 300 concludes with step 304 in which the secure wireless connection is verified on the first device using the visible light signal. Step 304 includes a first component step 305 in which verifying the secure wireless connection on the first device using the visible light signal includes generating the same visible light signal on the first device using a display on the first device. For example, the first device can include a display that depicts the same visible light signal as shown on the second device. Step 304 also includes a second component step 306 in which verifying the secure wireless connection on the first device using the visible light signal includes accepting a comparison verification input on a user interface of the first device. For example, the first device can accept an input by a human user verifying the secure wireless connection after the human user has compared the visible light signal on the second device with the visible light signal displayed on the first device. In specific embodiments of the invention, the visible light signal generated on the second device and the same visible light signal displayed on the first device are determined based on a Diffie-Hellman shared secret between the two devices. In specific embodiments of the invention, the second device does not include a display.

FIG. 3 is, as illustrated, a comparison verification by a human user, but the visible light signal generated using a pattern of colors can also be viewed by a camera and automatically compared. For example, device 311 can be a mobile device with a camera that can be used to capture the color pattern and/or temporal pattern on device 321 and compare the pattern with the pattern being depicted by device 311 to verify the secure wireless connection.

Alternatively, an interface on a more feature-rich first device could allow a user to input a particular pattern of colors on the first device that matches the specific pattern of colors viewed on the second device in order to verify the secure wireless connection. For example, a user could be provided with one or more color wheel interfaces on the more feature rich device to match one or more depicted colors to the actual color of light being generated by the color pattern on the less feature rich device.

Figure 4:
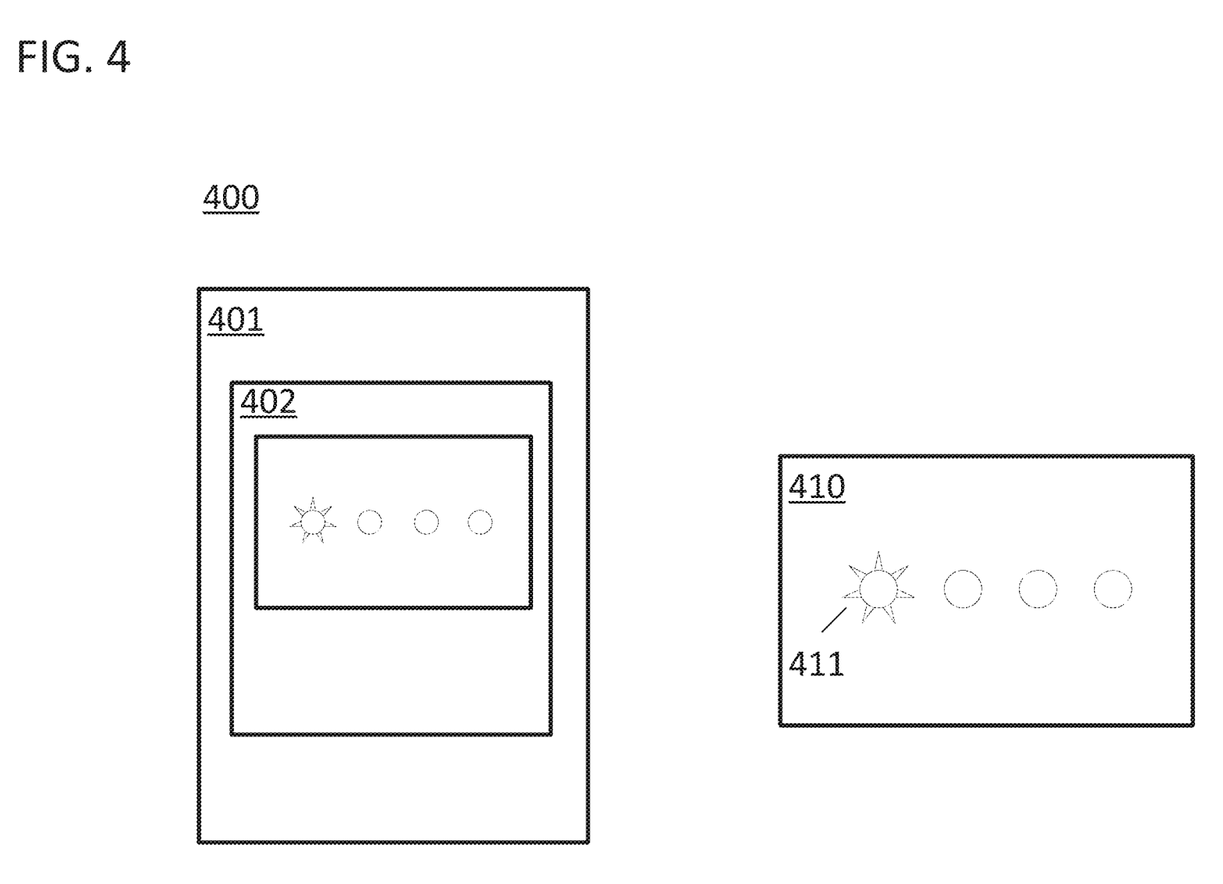
FIG. 4 is a block diagram of a system for using visible light communication for verifying a secure wireless connection between two devices by allowing a human user to compare an illustrated display of illuminated light sources on a display against actual illuminated light sources on an accompanying device in accordance with specific embodiments of the invention disclosed herein.

FIG. 4 is a block diagram 400 of a system for using visible light communication for verifying a secure wireless connection between two devices by allowing a human user to compare a display of a pattern of flashing light sources on a display against a specific illumination pattern of actual light sources on an accompanying device in accordance with specific embodiments of the invention disclosed herein. Block diagram 400 includes a first device 401 with a display 402 and a second device 410 with actual light sources such as 411 that can be used for visible light communication. For example, the first device can be a mobile device with a display and a second device can be a payment dongle with LEDs that can be flashed in a specific illumination pattern to present an encoded visible light signal to a human user. The visible light signal can be encoded using an encoding algorithm such as but not limited to the Manchester encoding algorithm. The visible light signal can also be encoded with an error-checking algorithm such as but not limited to the Reed-Solomon algorithm and can be supplemented with a checksum such as but not limited to a CRC-32 checksum. In addition, the visible light signal can be transmitted more than once by flashing the illumination pattern. In the example of block diagram 400, actual light source 411 is shown to be flashing as part of an illumination pattern on the second device, and a human user can compare the illumination pattern of the actual light sources on the second device with the display 402 of flashing light sources on the first device to verify the secure wireless connection between the two devices.

FIG. 4 is as illustrated a comparison verification by a human user, but the illumination pattern encoding the visible light signal could also be viewed by a visible light sensor. For example, device 401 can be a mobile device with a camera that can be used to capture the illumination pattern on device 410. Device 401 can demodulate the visible light signal from the captured illumination pattern, along with any checksums or error correcting codes, and use the visible light signal to verify the secure wireless connection. Alternatively, an interface on the more feature-rich first device could allow a user to input a particular illumination pattern on the first device that matches the specific illumination pattern viewed on the second device in order to verify the secure wireless connection.

Figure 5:
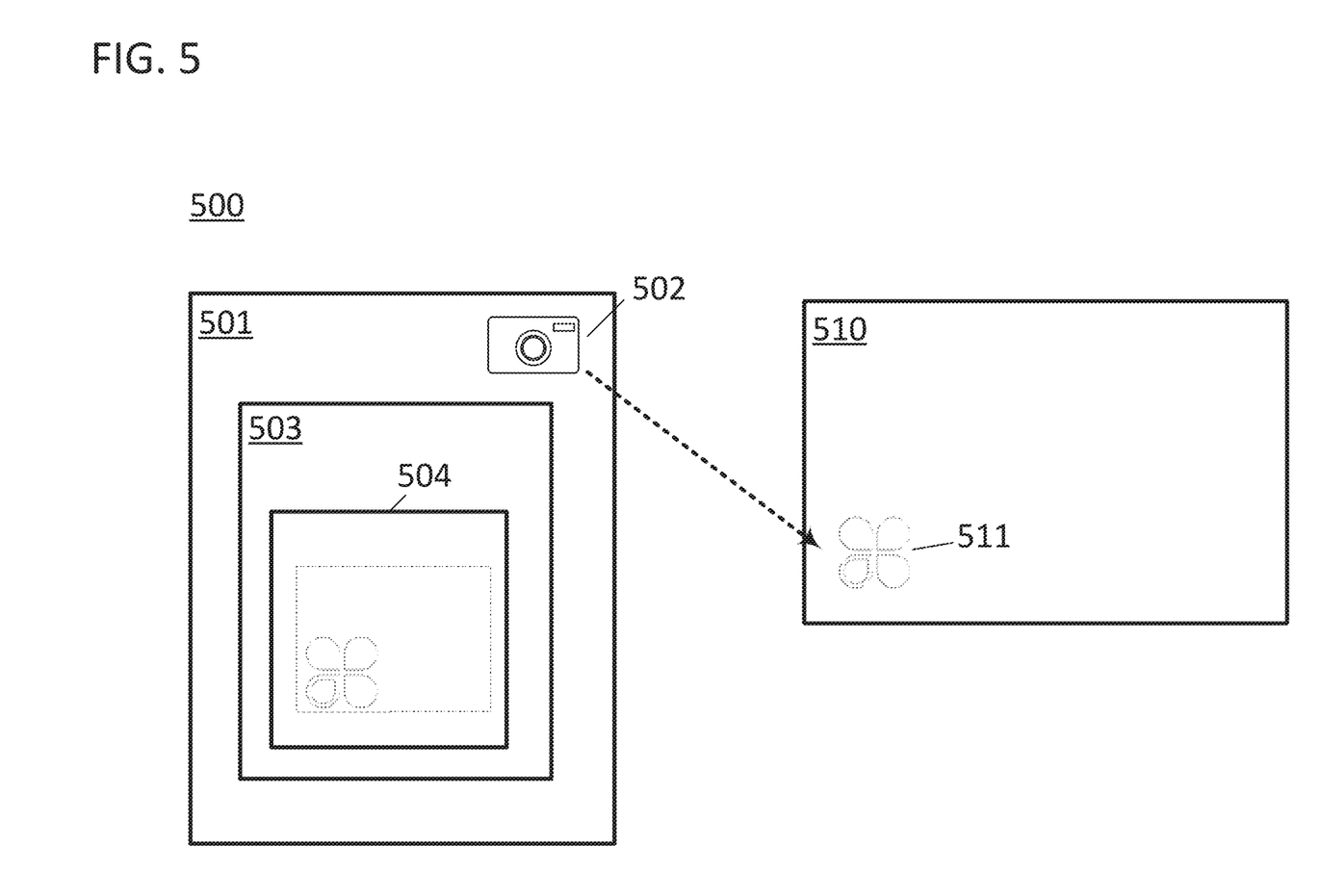
FIG. 5 is a block diagram of a system for aligning a visible light sensor on a first device with an illuminated logo on a second device to allow the devices to communicate using visible light communication in accordance with specific embodiments of the invention disclosed herein.

FIG. 5 is a block diagram 500 of a system for aligning a visible light sensor 502 on a first device 501 with an illuminated logo 511 on a second device 510 to allow the devices to communicate using visible light communication in accordance with specific embodiments of the invention disclosed herein. For example, the first device can be a mobile device with a camera and the second device can be a payment dongle or secure card reader. The first device can include an application 503 displayed on a display of the first device 501 that prompts a user to point the visible light sensor 502 at the second device 510. Application 503 can also prompt the user to initiate a wireless secure connection between the first and the second device in order to pair the two devices.

As shown in block diagram 500, application 503 can display an image 504 from the visible light sensor 502 in which an outline of the second device that includes the illuminated logo is superimposed on the image. As an example, the image can be a camera view from a camera acting as a visible light sensor. Superimposing the outline of the second device on the displayed image from the visible light sensor exhibit certain benefits as a user is encouraged to ensure the image of the second device captured by the visible light sensor is within a limited size range and of a desired orientation, which can result in faster and more efficient detection of the illuminated logo using computer vision algorithms such as but not limited to the generalized Hough transform algorithm.

Figure 6:
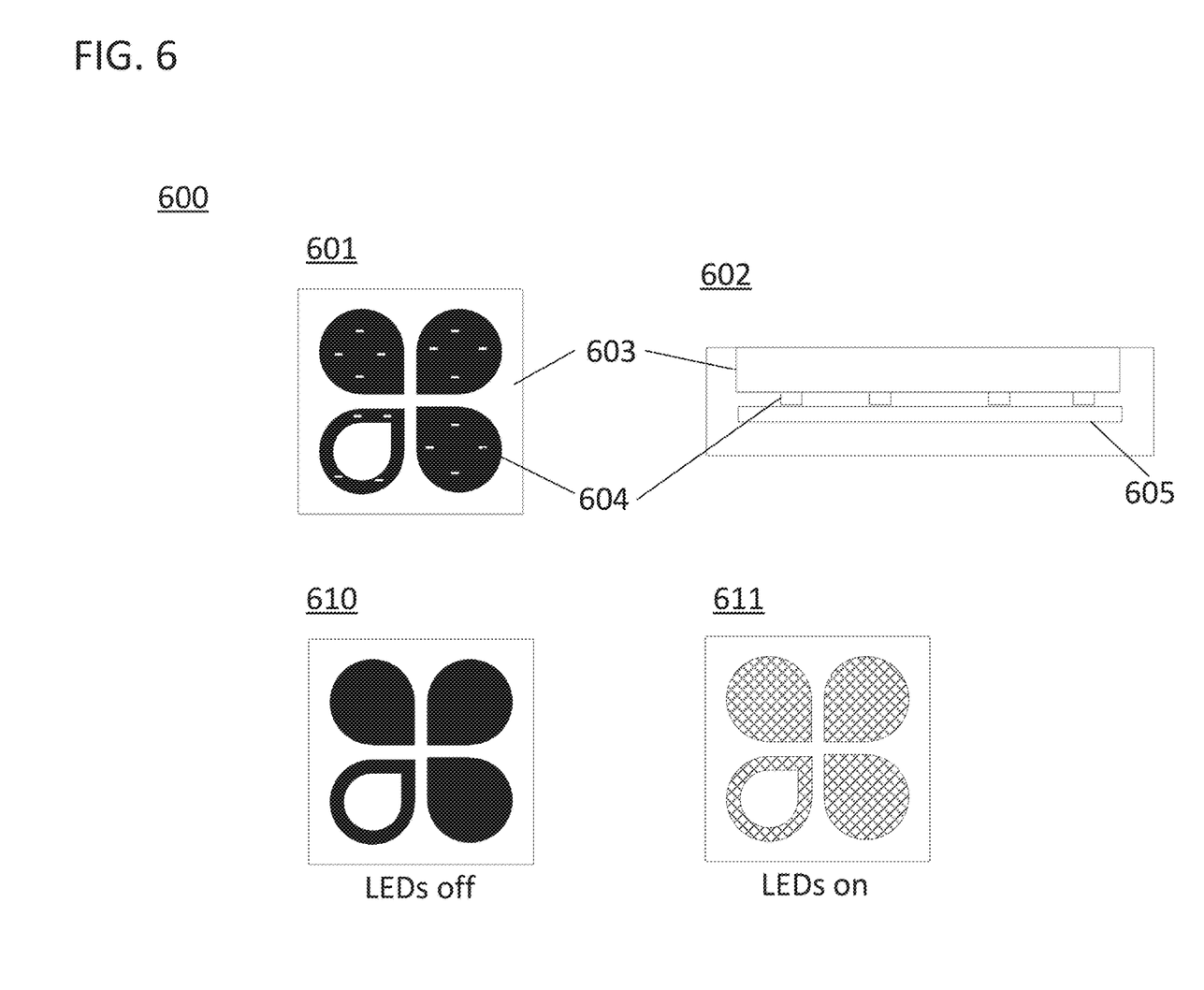
FIG. 6 is a block diagram of a system for illuminating a logo to be used for a visible light communications channel in accordance with specific embodiments of the invention disclosed herein.

FIG. 6 is a block diagram 600 of a system for illuminating a logo to be used for a visible light communications channel in accordance with specific embodiments of the invention disclosed herein. As shown in block diagram 600, block 601 is a top view of a device that implements a system for illuminating a logo to be used for a visible light communications channel, and block 602 is a side view of the same device. In the example of blocks 601 and 602, the device is shown to have a top layer 603 that reveals a logo and a second layer 605 with LEDs 604 beneath the top layer. For example, the device can be a payment dongle with a top layer of diffusing glass or plastic printed with an inverse silkscreen of a logo, and the second layer can be a printed circuit board or silicon mesh with LEDs that can be used to illuminate the logo as a channel for visible light communication.

The diffusing layer 603 can also be pigmented to contrast with the silkscreen of the logo so that the logo is visible when the LEDs are off as in 610. In specific embodiments of the invention, the LEDs are colored LEDs, and the logo appears in a different color when the LEDs are on as in 611. In specific embodiments of the invention, the logo is a monochromatic logo with a limited number of edges, which can allow for faster and more efficient detection of the logo using computer vision algorithms such as but not limited to the generalized Hough transform algorithm.

Figure 7:
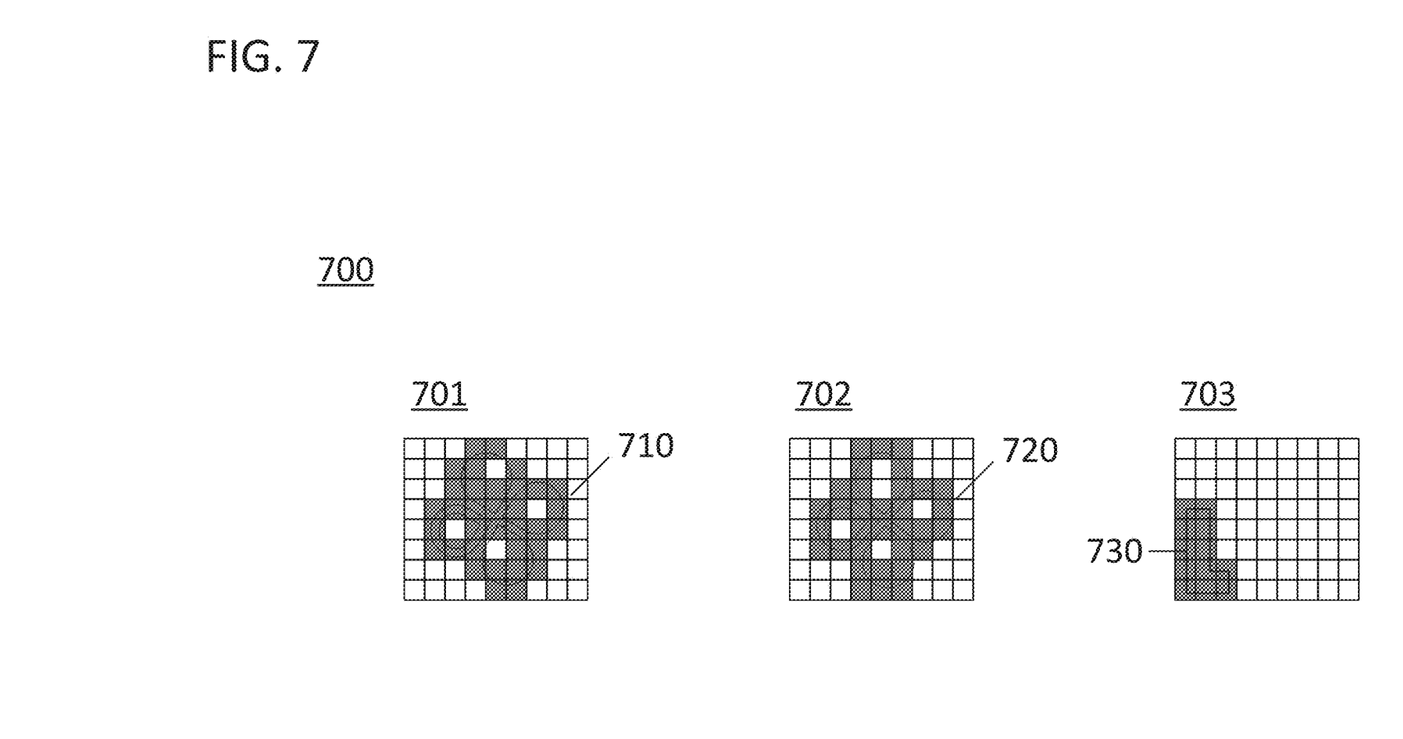
FIG. 7 is a block diagram of a system for identifying a logo using computer vision algorithms in accordance with specific embodiments of the invention disclosed herein.

FIG. 7 is a block diagram 700 of a system for identifying a logo using computer vision algorithms in accordance with specific embodiments of the invention disclosed herein. In the example of block diagram 700, the generalized Hough transformation algorithm can be used to identify a logo in accordance with specific embodiments of the invention disclosed herein. For example, first a two-dimensional array can be constructed for a target image 710 as shown in block 701. In specific embodiments of the invention, the target image is a logo.

An edge map of an input image such as 720 or 730, as shown in blocks 702 and 703, can be constructed using edge detection algorithms such as but not limited to the Canny edge detection algorithm. By iterating across a set of parameters, an edge map of the target image can also be generated. For example, the set of parameters can include the coordinates of a starting pixel, a rotation parameter, and a scale parameter. Alternatively, the edge map of the target image can be precomputed.

By iterating across the set of parameters for each pixel in the edge map of the target image and incrementing a counter each time it is determined that a pixel in the edge map of the target image can also be found in the edge map of the input image, a final value of the counter can be stored for the set of parameters and can be used to compare against a predefined threshold for the target image in order to identify the target image. For example, if the final value of the counter exceeds the value of the predefined threshold for the target image, the target image would be identified based on the input image. Otherwise, the target image would not be identified based on the input image. In the example of block diagram 700, target image 710 would be identified based on input image 720 using the generalized Hough transform algorithm but would not be identified based on input image 730 using the generalized Hough transform algorithm. In specific embodiments of the invention, the generalized Hough transform algorithm is performed on a down-sampled target image. In specific embodiments of the invention, applying the generalized Hough transform uses a pseudo-random subset of pixels in the edge map of the target image. Specific embodiments of the invention accordingly exhibit certain benefits including but not limited to increasing the speed of identifying a logo using computer vision algorithms.

In specific embodiments of the invention, the visible light signal can encode various types of information related to the secure wireless connection and/or the formation thereof. The visible light signal will be representative of this information in that the signal can be decoded into that information. The VLC signal could include a signal for numeric comparison to allow a human observer or automated system to assure that the two devices were in communication with each other via the secure channel by comparing an encoded string held on both devices. In specific embodiments of the invention, such a string could be a shared secret generated during an initial handshake of the wireless connection for which the VLC signal was providing a layer of verification. In specific embodiments of the invention, the shared secret is generated on both devices via a Diffie-Hellman key exchange in which cryptographic material is exchanged between the devices. In specific embodiments of the invention, the VLC signal could encode a temporary key used to finalize a wireless connection such as in the case of a Bluetooth pairing procedure. In specific embodiments of the invention, the VLC signal could serve as the delivery mechanism for an out-of-band (OOB) key delivery for the wireless connection. For example, a second device can generate an OOB temporary key and can also encode the OOB temporary key in a visible light signal. For example, the visible light signal can be a pattern of LED colors displayed by LEDs on the second device. A first device can generate the same OOB temporary key by capturing the visible light signal displayed on the second device using a visible light sensor on the first device such as but not limited to a camera. In many of these embodiments, care should be taken to assure that the visible light signal is not widely visible or otherwise susceptible to over-the-shoulder attacks. If the visible light signal is an OOB key delivery mechanism, the signal should be fully shielded from eavesdroppers.

Figure 8:
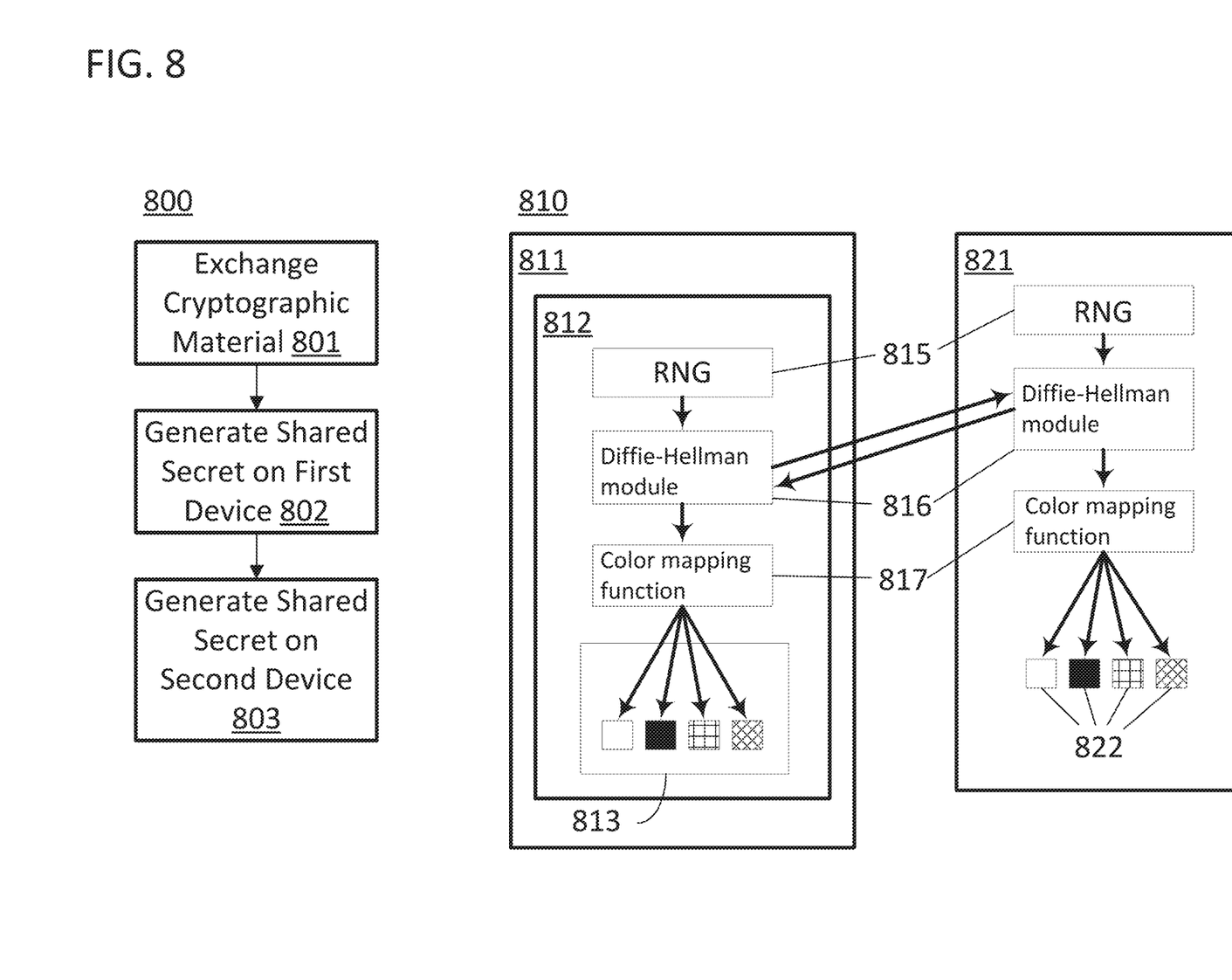
FIG. 8 is a block diagram of a system, and an associated flow chart of a method, for using visible light communication for a comparison verification procedure, based on the generation of a shared secret on two devices, for verifying a secure wireless connection between those two devices in accordance with specific embodiments of the invention disclosed herein.

FIG. 8 is a block diagram of a system, and an associated flow chart of a method, for using visible light communication for a comparison verification procedure, based on the generation of a shared secret on two devices, for verifying a secure wireless connection between those two devices in accordance with specific embodiments of the invention disclosed herein. Block diagram 810 includes a first device 811 with an application 812 and a second device 821 with LEDs 822. For example, the first device can be a mobile device with an application and a display and the second device can be a payment dongle with LEDs.

In the example of block diagram 810, the devices can exchange cryptographic material that can be used to generate a shared secret on both devices, and a secure wireless connection between the devices can be verified using visible light communication based on the shared secret. For example, a shared secret can be generated through a Diffie-Hellman key exchange, which would allow the two devices to securely exchange cryptographic material over an insecure channel. In the example of block diagram 810, each device includes a random number generator 815, a Diffie-Hellman module 816, and a color mapping function 817. Each device can use its random number generator to generate a random number and apply a transform to the random number to generate a public value. The devices can then exchange their public values between the Diffie-Hellman modules, and each device can combine its local random number with the remote public value to derive a shared secret on both devices. In specific embodiments of the invention, the shared secret is a temporary key that can be used to verify a secure wireless connection such as but not limited to a Bluetooth pairing connection.

Both devices can encode the shared secret or a derivative of the shared secret in a visible light signal. For example, the shared secret can be encoded as a pattern of LED colors via a color mapping function. An example of a color mapping function could involve using pre-designated three-byte segments of an LED as hex color codes. Device 821 can display the LED color pattern using LEDs 822, as indicated by the different shadings of each LED, and application 812 on device 811 can display the same LED color pattern by displaying a depiction 813 of device 821 with LEDs matching the LED color pattern. A human user can compare the depiction of the LED color pattern shown on the first device with the LED color pattern shown on the second device in order to verify the secure wireless connection. Alternatively, the LED color pattern can be compared by an automated visible light sensor on the first device such as but not limited to a camera with a string encoding an LED color pattern stored on the first device's internal memory.

Flow chart 800 begins with step 801 in which cryptographic material is exchanged between a first device and a second device in order to initiate a secure wireless connection between the two devices. In specific embodiments of the invention, each device generates a random number that is used to generate a public value, and the cryptographic material exchanged between the devices are each device's public value. Flow chart 800 continues with step 802, in which a shared secret is generated on the first device using the exchanged cryptographic material. For example, the shared secret on the first device can be generated by combining the random number used to generate the public value on the first device with the public value received from the second device. Flow chart 800 concludes with step 803, in which a shared secret is generated on the second device using the exchanged cryptographic material. In specific embodiments of the invention, the second device does not include a display.

In specific embodiments of the invention, the secure wireless connection to be verified using VLC can be a radio frequency connection, an infrared connection, an ultraviolet light connection, and any other form of wireless connection that is not a visible light connection. For example, the secure wireless connection can be a Bluetooth connection, a WiFi Direct connection, an ultra-wideband (UWB) connection, a ZigBee connection, or some other secure wireless connection that can be verified using VLC. In specific embodiments of the invention, the secure wireless connection is between a first device and a second device. In the example of FIG. 2, a first device 211 can be a mobile device including but not limited to a smartphone, a smartwatch, a PDA, a camera, and a media player, and a second device 221 can include but not be limited to another mobile device, a payment terminal such as a secure card reader, a computing device such as a laptop, or an electronic device such as a headset or a speaker.

While the specification has been described in detail with respect to specific embodiments of the invention, it will be appreciated that those skilled in the art, upon attaining an understanding of the foregoing, may readily conceive of alterations to, variations of, and equivalents to these embodiments. The devices mentioned herein, such as the first device and the second device, can individually include processors and computer readable media accessible to those processors. The computer readable media can store instructions that are executable by the processors to cause the devices to execute the methods disclosed herein. Although examples in the disclosure were generally directed to the use of visible light communications (VLC) for purposes of verifying a secure wireless connection between two devices, the secure wireless connection can be between any number of devices in any form of network topology including mesh, hub-and-spoke, or daisy-chain topologies. In the examples provided, the second device is generally a less feature-rich device which lacks at least one user interface that is present on the first device (e.g., the first device has a touch display while the second device does not include a display).

However, the approaches disclosed herein can be applied to devices with any relative degree of functionality between them. Furthermore, in the examples provided, a comparison verification procedure can be done by a human user visually inspecting a visible light signal. However, the approaches disclosed herein can involve an automated visual light sensor performing a comparison verification procedure without a human user. These and other modifications and variations to the present invention may be practiced by those skilled in the art, without departing from the scope of the present invention, which is more particularly set forth in the appended claims.

What is claimed is:

1. A system comprising:
   one or more memories having computer-readable instructions stored thereon; and
   one or more processors of a first device that execute the computer-readable instructions to establish a secure connection with a second device by:
   initializing a wireless connection with the second device by:
     generating a random number;
     generating a shared secret by combining the random number with a remote public value received from the second device; and
     encoding the shared secret or a derivative of the shared secret into a visible light signal;
   generating a first pattern of light emitting diode colors based on the visible light signal on the first device in response to initializing the wireless connection with the second device; and
   verifying that the wireless connection is secure based upon a comparison of the first pattern with a second pattern of the light emitting diode colors displayed on the second device.

2. The system of claim 1, wherein the computer-readable instructions further cause the one or more processors to:
   generate a public value of the first device; and
   send the public value of the first device to the second device.

3. The system of claim 2, wherein to generate the public value of the first device, the computer-readable instructions further cause the one or more processors to apply a transform to the random number.

4. The system of claim 1, wherein the shared secret comprises a temporary key configured to verify the wireless connection between the first device and the second device.

5. The system of claim 1, wherein the first device is a payment terminal and the second device is a mobile device.

6. The system of claim 1, wherein the computer-readable instructions further cause the one or more processors to:
   determine that the first pattern matches the second pattern, wherein verifying that the wireless connection is secure is based on determining that the first pattern matches the second pattern.

7. The system of claim 1, wherein the wireless connection comprises one of a radio frequency connection, an infrared connection, or an ultraviolet light connection.

8. The system of claim 1, wherein the computer-readable instructions further cause the one or more processors to generate the shared secret using a Diffie-Hellman key exchange.

9. One or more non-transitory computer-readable media comprising computer-readable instructions stored thereon which when executed by one or more processors of a first device to establish a secure connection with a second device cause the one or more processors to:
   initialize a wireless connection with the second device by:
     generating a random number;
     generating a shared secret by combining the random number with a remote public value received from the second device; and
     encoding the shared secret or a derivative of the shared secret into a visible light signal;
   generate a first pattern of light emitting diode colors based on the visible light signal on the first device in response to initializing the wireless connection with the second device; and
   verify that the wireless connection is secure based upon a comparison of the first pattern with a second pattern of the light emitting diode colors displayed on the second device.

10. One or more non-transitory computer-readable media of claim 9, wherein the computer-readable instructions further cause the one or more processors to:
    generate a public value of the first device; and
    send the public value of the first device to the second device.

11. One or more non-transitory computer-readable media of claim 10, wherein to generate the public value of the first device, the computer-readable instructions further cause the one or more processors to apply a transform to the random number.

12. One or more non-transitory computer-readable media of claim 9, wherein the shared secret comprises a temporary key configured to verify the wireless connection between the first device and the second device.

13. One or more non-transitory computer-readable media of claim 9, wherein the first device is a payment terminal and the second device is a mobile device.

14. One or more non-transitory computer-readable media of claim 9, wherein the computer-readable instructions further cause the one or more processors to:
    determine that the first pattern matches the second pattern, wherein verifying that the wireless connection is secure is based on determining that the first pattern matches the second pattern.

15. One or more non-transitory computer-readable media of claim 9, wherein the wireless connection comprises one of a radio frequency connection, an infrared connection, or an ultraviolet light connection.

16. One or more non-transitory computer-readable media of claim 9, wherein the computer-readable instructions further cause the one or more processors to generate the shared secret using a Diffie-Hellman key exchange.

* * * * *